United States Patent [19]

Epple

[11] 3,826,984

[45] July 30, 1974

[54] MEASURING DEVICE FOR THE DYNAMIC MEASUREMENT OF SEMICONDUCTOR PARAMETERS AND METHOD OF MAKING SUCH A DEVICE

[75] Inventor: Richard Epple, Schwaigern, Germany

[73] Assignee: Licentia Patent-Verwaltungs-G.m.b.H., Frankfurt am Main, Germany

[22] Filed: Jan. 24, 1972

[21] Appl. No.: 220,491

Related U.S. Application Data

[63] Continuation of Ser. No. 13,961, Feb. 25, 1970, abandoned.

[30] Foreign Application Priority Data

Feb. 28, 1969 Germany.............................. 1910314

[52] U.S. Cl. .......................... 324/158 P, 324/158 F
[51] Int. Cl. ......................... G01r 1/06, G01r 31/02
[58] Field of Search............ 324/158 P, 158 F, 72.5, 324/149; 339/108 TP

[56] References Cited
UNITED STATES PATENTS
3,377,514  4/1968  Ruehlemann et al. .......... 324/158 F
3,405,361  10/1968  Kattner et al. .................. 324/158 P

OTHER PUBLICATIONS

Brunner et al.; "Microcircuit Probe;" IBM Tech. Dis. Bull.; Vol. 9; Feb. 1967; pp. 1081–1082.

Primary Examiner—Alfred E. Smith
Assistant Examiner—Ernest F. Karlsen
Attorney, Agent, or Firm—Spencer & Kaye

[57] ABSTRACT

A measuring device for the dynamic measurement of semiconductor parameters comprises a plurality of flat metal contacts attached to a supporting member, the contacts having contact portions on one flat surface of each contact. Preferably the supporting member is recessed and the contacts extend into the recess. A method of making such a device is also disclosed.

10 Claims, 8 Drawing Figures

PATENTED JUL 30 1974 3,826,984

Inventor:
Richard Epple

BY Spencer & Kays
ATTORNEYS

MEASURING DEVICE FOR THE DYNAMIC MEASUREMENT OF SEMICONDUCTOR PARAMETERS AND METHOD OF MAKING SUCH A DEVICE

CROSS REFERENCE TO RELATED APPLICATION

This application is a continuation of applicant's copending U.S. Pat. application Ser. No. 13,961, filed Feb. 25th, 1970, now abandoned.

BACKGROUND OF THE INVENTION

The invention relates to a measuring device for the dynamic measurement of semiconductor parameters and a method of making such a device.

In order to measure the static parameters of semiconductor components and integrated monolithic semiconductor circuit arrangements, a measuring device with a plurality of point contacts are used today. In particular, in measuring devices for integrated circuit arrangements, devices having numerous measuring points have become known, so-called multiprobers. In order to establish electrical contact between the multiprober and the semiconductor components or integrated circuit arrangements, either the multiprober is lowered on to the semiconductor wafer to be measured or conversely, the semiconductor wafer is pressed against the multiprober. The individual contact points of the multiprober are generally displaceable both in the x and y directions as well as in height.

The known multiprobers have the disadvantage, however, that no dynamic measurements can be carried out with them.

SUMMARY OF THE INVENTION

It is therefore the object of the invention to provide a measuring device which can also be used for the dynamic measurement of semiconductor parameters.

According to the invention there is provided a measuring device fo the dynamic measurement of semiconductor parameters comprising a supporting member and a plurality of flat metal contacts attached to said supporting member and having contact portions on one flat surface of each of said metal contacts.

Further according to the invention, there is provided a measuring device for the dynamic measurement of semiconductor parameters comprising a supporting member defining a recess, a plurality of flat metal strip contacts attached at one end to said supporting member and having contact portions on one flat surface of each of said metal strip contacts at the free end thereof projecting into the recess.

The invention also includes a method of making such devices.

BRIEF DESCRIPTION OF THE DRAWINGS.

The invention will now be described in greater detail, by way of example, with reference to the accompanying drawings, in which.

DESCRIPTION OF THE PREFERRED EMBODIMENTS

Basically the invention provides that flat metal contacts are provided instead of measuring points in a measuring device according to the invention and are brought into contact with the contact positions perpendicular to their longitudinal extent.

The flat metal contacts provided according to the invention may consist, for example, of metal strips or metal foils. These metal strips of metal foils are preferably mounted on a supporting member provided with a recess in such a manner that they project, with their contactmaking end, into said recess. If the supporting member comprises a circular recess, the flat metal contacts are disposed radially towards the center of the circular recess.

It is advisable to narrow the flat metal contacts towards the contact-making end. Accordingly metal contacts which are made in the shape of a circular segment for example are used with a supporting member having a circular recess.

According to a further development of the invention, a metal coating which increases the abrasion resistance is provided on the flat metal contacts. Such a coating may consist, for example of tungsten carbide.

Figure 1:
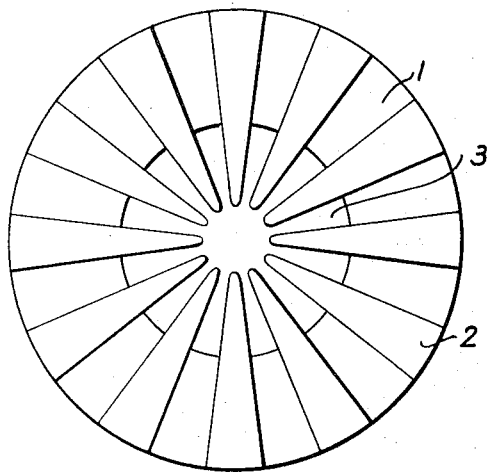
FIG. 1 is a plan view a sectional elevation of one form of device in accordance with the invention.

Referring now to the drawings FIG. 1 shows in plan view, as well as in sectional illustration, a supporting member 1 provided according to the invention, with the flat metal contacts 2 present thereon which are also designated as metal fingers or prober fingers. The supporting member 1 may consist, for example, of a disc of insulating material which has a recess 3 in the middle. In the example, the disc 1 as well as the recess 3 is round or circular but the supporting member as well as the recess may, of course, also be of any other shape.

In the example shown in FIG. 1, the contact fingers 2 extend radially towards the center of the recess 3 and are in the form of circular segments. The contact fingers are narrowed off towards the contact-making end project with their pointed ends into the recess as a result of which they have a certain resilience. The resilience of the contact fingers depends not only on the modulus of elasticity of the material of the contact fingers but also on the shape and thickness of the fingers as well as on the length of the portion of the finger projecting into the recess. The contact fingers are rigidly connected to the surface of the supporting member, for example by means of a flat soldered joint.

Figure 2A:
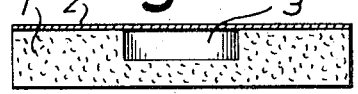
FIGS. 2 and 2a through 2e illustrate the stages of production of a form of device in accordance with the invention.
Figure 2B:
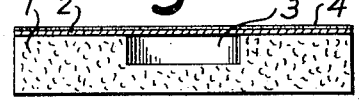
Figure 2C:
Figure 2D:
Figure 2E:
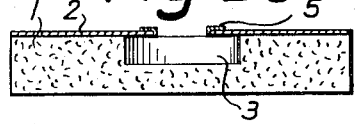
Figure 2:
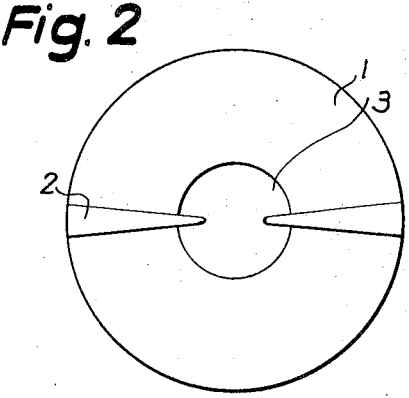

The production of a multiprober according to the invention may be effected, for example by the method illustrated in FIG. 2. According to FIG. 2a, the starting point, for example, is a supporting member 1 which is provided with a recess 3 and which consists, for example, of ceramic or quartz. A metal foil 2, which is soldered to the surface of the supporting member for example, is provided over the whole area of the surface of the supporting member provided with the recess, as shown in FIG. 2a. It is also possible, however, to vapor-deposit a thin metal layer on the supporting member and then to reinforce this to the optimum thickness for example, electrolytically, in accordance with the known "beam lead" technique. As FIG. 2 shows, the metal layer or metal foil 2 bridges the recess 3 and so does not adhere to the bottom of the recess.

In a further method step, in accordance with FIG. 2b, a layer of photolacquer 4 is applied to the metal layer 2 in accordance with the etching-mask technique used in the semiconductor art, and serves as an etching mask during the etching out of the metal finger structure of FIG. 1, after appropriate exposure and development. FIG. 2c shows the photolacquer layer 4 already exposed and developed in structured form by means of an appropriate exposure mask, its structure corresponding, after the exposure and development, to the metal finger structure of FIG. 1.

After the exposure and development of the photolacquer layer 4, the metal layer 2 is etched in an etching solution which only attacks the metal layer 2 but not the photolacquer layer 4 provided as an etching mask. The etched metal layer 4 (FIG. 2d) provides the metal finger structure of FIG. 1.

Since the metal used for the contact fingers 2 generally has inadequate abrasive strength, in a last method step as shown in FIG. 2e, an abrasion-resistant coating 5, which consists of tungsten carbide for example, is applied to the tips of the contact fingers 2. The application of the metal coating 5 may be effected by vapor-deposition for example. In order that only the tips of the metal fingers 2 and not their entire area may receive the metal coating 5, in order to obtain the resilience of the fingers, the coating may appropriately be vapor-deposited through metal masks.

Figure 3:
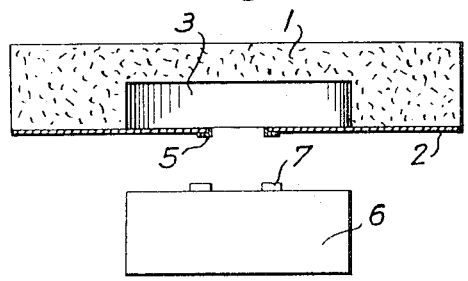
FIG. 3 is a sectional elevation of the device of FIG. 1 or FIG. 2 showing adjacent thereto a semiconductor with parameters which are to be measured.

Finally, FIG. 3 shows how, by means of the measuring device according to the invention, contact can be made to a semiconductor wafer 6 with the electrodes 7. Contact is made by pressing the semiconductor wafer 6 with the contact 7 against the contact fingers 2 provided with the metal coatings 5, or conversely the supporting member 1 with the contact fingers is brought up to the semiconductor wafer 6.

It will be understood that the above description of the present invention is susceptible to various modifications, changes and adaptations.

What is claimed is:

1. A measuring device for the dynamic measurement of semiconductor parameters comprising:
   a. a supporting member having a recess which extends into and only partially through said support member from one surface thereof; and
   b. a plurality of flat metal strip contacts formed as segments of a circle, said strip contacts being attached at one end to said one surface of said supporting member and extending with their free ends over said recess and with said plurality of flat metal strip contacts lying, throughout their entire length, in one plane, each of said strip contacts having a contact portion including a part of one flat surface of each said metal contact at the free end thereof with said one flat surface being opposite to the surface of said strip contact which is attached to said supporting member, so that the contact between said contact portions and a semiconductor occurs on the side of said supporting member to which said contacts are attached and at right angles to the length of said contacts.

2. A device as defined in claim 1, wherein said flat metal strip contacts comprise metal foil.

3. A device as defined in claim 1, wherein said supporting member defines a circular recess.

4. A measuring device as defined in claim 3, wherein said plurality of flat metal contacts are disposed in a circle about said recess and extend radially toward the center of the circular recess.

5. A measuring device as defined in claim 4, wherein said flat metal contacts include a narrowing portion towards their free ends.

6. A measuring device as defined in claim 5, further comprising a metal coating on said flat metal contacts for increasing their abrasive strength.

7. A measuring device as defined in claim 6, wherein said metal coating comprises tungsten carbide.

8. A measuring device as defined in claim 4, wherein said supporting member comprises ceramic.

9. A measuring device as defined in claim 4, wherein said supporting member comprises quartz.

10. A measuring device for the dynamic measurement of semiconductor parameters comprising:
    a. a supporting member having a recess which extends into and only partially through said supporting member from one surface thereof and which is open to the surrounding atmosphere at said one surface; and
    b. a plurality of planar metal strip contacts formed so that one end thereof is wider than the other end, each of said strip contacts being attached at said one end to said one surface of said supporting member and extending with its free end over said recess, each of said strip contacts having a contact portion including a part of one flat surface of each said metal contact at said free end thereof with said one flat surface being opposite to the surface of said strip contact which is attached to said supporting member, so that the contact between said contact portions and a semiconductor occurs on the side of said supporting member to which said contacts are attached and at right angles to the length of said contacts.

* * * * *